(12) United States Patent
Arnim

(10) Patent No.: US 8,734,973 B1
(45) Date of Patent: May 27, 2014

(54) SMOKE DETECTOR WITH SELF-LOWERING BATTERY TRAY

(76) Inventor: Carol Arnim, Mesquite, NV (US)

(*) Notice: Subject to any disclaimer, the term of this patent is extended or adjusted under 35 U.S.C. 154(b) by 0 days.

(21) Appl. No.: 13/135,679

(22) Filed: Jul. 11, 2011

Related U.S. Application Data

(60) Provisional application No. 61/399,251, filed on Jul. 12, 2010.

(51) Int. Cl.
| | |
|---|---|
| *H01M 2/00* | (2006.01) |
| *G08B 23/00* | (2006.01) |
| *G08B 17/10* | (2006.01) |
| *B65H 1/00* | (2006.01) |
| *B65D 85/00* | (2006.01) |

(52) U.S. Cl.
USPC .......... 429/61; 340/500; 340/693.1; 340/628; 221/282; 206/703

(58) Field of Classification Search
CPC ........ G08B 23/00; G08B 21/00; G08B 17/10; B65H 1/00; B65D 85/00; H01M 2/00
USPC ................... 429/61–64; 206/703; D10/106.2; 340/636.1
See application file for complete search history.

(56) References Cited

U.S. PATENT DOCUMENTS

| | | | |
|---|---|---|---|
| 466,509 A | 1/1891 | Painter | |
| 482,263 A | 9/1892 | Moore | |
| 1,309,286 A | 7/1919 | Hopkins | |
| 1,469,946 A | 10/1923 | Morrison | |
| 1,612,504 A | 12/1926 | Furman | |
| 2,518,979 A | 8/1950 | Davidson | |
| 2,705,791 A | 4/1955 | Merancy | |
| 3,916,404 A | 10/1975 | Gouge | |
| 4,030,086 A | 6/1977 | Salem | |
| 4,228,428 A | 10/1980 | Niedermeyer | |
| 4,372,432 A | 2/1983 | Waine et al. | |
| 4,489,308 A | 12/1984 | Logan, Jr. | |
| 4,514,725 A | 4/1985 | Bristley | |
| 5,053,752 A * | 10/1991 | Epstein et al. | 340/628 |
| 5,646,598 A * | 7/1997 | Nickles et al. | 340/628 |
| 6,142,439 A * | 11/2000 | Aramaki | 248/327 |
| 7,233,254 B2 * | 6/2007 | Howell | 340/628 |
| 2007/0103330 A1 * | 5/2007 | McGrath | 340/693.1 |

* cited by examiner

*Primary Examiner* — Patrick Ryan
*Assistant Examiner* — Kiran Quraishi
(74) *Attorney, Agent, or Firm* — Ramon L. Pizarro; Edwin H. Crabtree

(57) ABSTRACT

A battery operated smoke detector with a system for lowering the battery of the smoke detector is disclosed. The smoke detector is of the type that is mountable from the ceiling of a structure. The battery of the smoke detector is part of a battery pack that is connected to a battery wire that is mounted on a spool. An engagement mechanism that allows the lowering of the spool and battery pack in response to a low-voltage condition controls the lowering of the battery pack. An electric motor is connected to the spool, and is used for raising the battery pack once a battery that is charged is connected to the system.

3 Claims, 1 Drawing Sheet

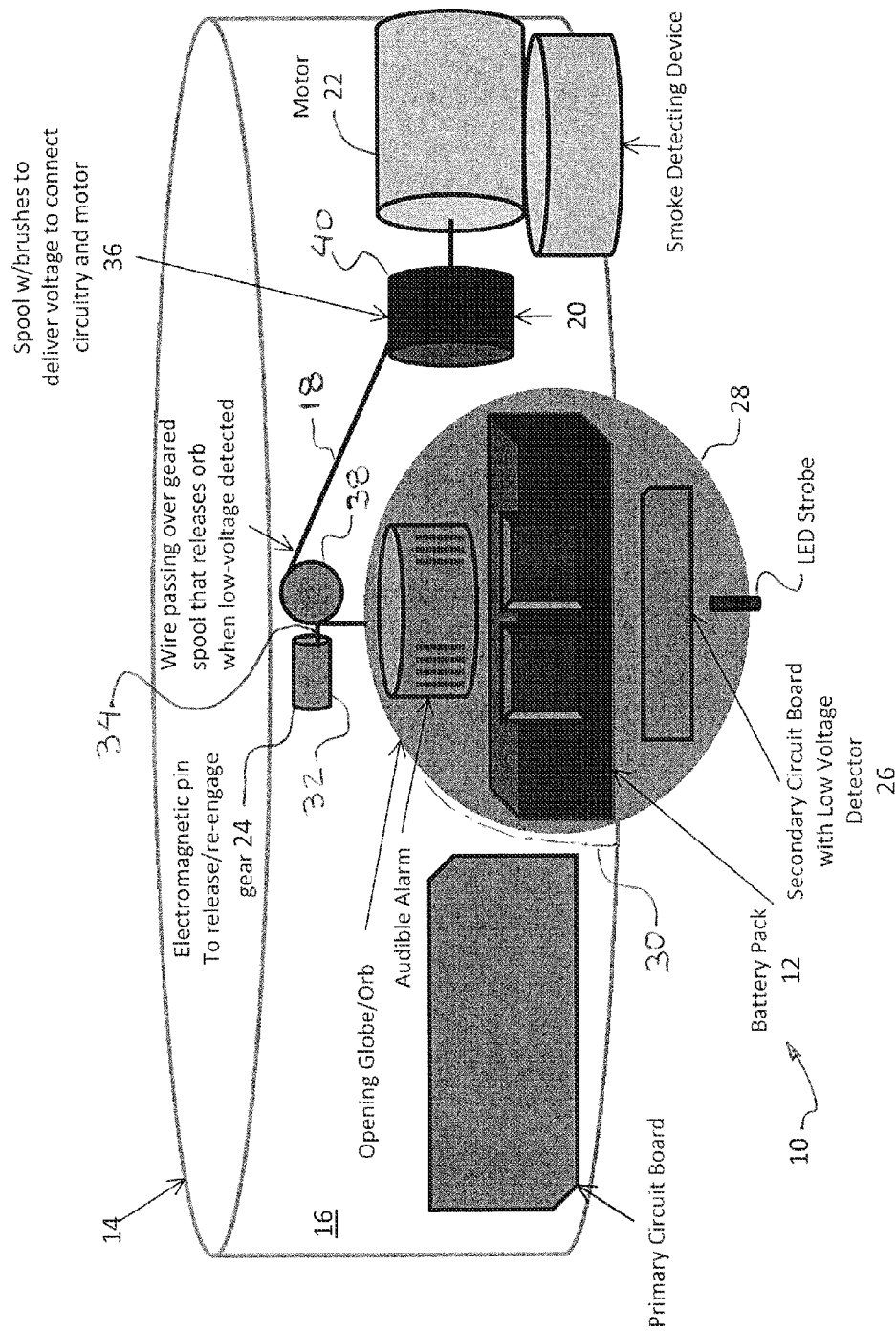

SMOKE DETECTOR WITH SELF-LOWERING BATTERY TRAY

REFERENCE OF RELATED APPLICATIONS

This application claims the benefit of my provisional application having Ser. No. 61/399,251, titled "SMOKE DETECTOR WITH SELF-LOWERING BATTERY TRAY", filed on Jul. 12, 2010, now abandoned.

BACKGROUND OF THE INVENTION (a) Field of the Invention

This invention generally relates to a device or system for facilitating the replacement of a spent battery in a smoke detector. More particularly, but not by way of limitation, to a system that automatically lowers the battery, battery pack, receptacle, or tray in a smoke detector when the battery needs to be changed, and then uses the power from the battery to raise the battery back into the smoke detector.

(b) Discussion of Known Art

Smoke detectors have long been accepted as an essential safety device for all buildings. Smoke detectors alert people inside a structure of the possibility of a fire and the need to evacuate the building. Because many fires are cause by electrical issues it is important that a smoke detector function independently from the building's electrical system. Accordingly, smoke detectors are predominantly battery-operated devices, which require periodic changing of the batteries.

Because the products of combustion that are to be detected by the smoke detector are typically lighter than air, smoke detectors must be positioned at high locations in the building. Typically, this means that smoke detectors installed in a home will be placed at high points on a ceiling. While the elevated location of the smoke detector helps the detector in doing its job, the position makes routine servicing of the detector difficult, if not dangerous.

Importantly, it is recommended that the batteries be replaced twice a year in smoke detectors. This task exposes the homeowner to the risk of falls, and may be impossible for homeowners that are wheelchair bound.

Therefore, a review of known devices reveals that there remains a need for a simple device that greatly facilitates the routine maintenance of smoke detectors, and more particularly, a system or method that facilitates the replacement of the battery in a smoke detector and advises the user of the need to replace the battery.

SUMMARY

It has been discovered that the problems left unanswered by known art can be solved by providing a system for lowering the battery for a smoke detector, or a smoke detector that includes a system for automatically lowering the battery of the smoke detector, where the a preferred example of the system includes:

A battery pack that is connected to a battery wire;

An engagement mechanism that releases the battery pack or battery receptacle;

A low-voltage detector that activates the engagement mechanism, causing the engagement mechanism to release the battery pack in response to a drop in voltage below a predetermined voltage level; and An electric motor connected to a spool for raising the battery pack.

According to a preferred embodiment of the invention the system for lowering the battery is housed within the housing for the entire smoke detector. However, it is contemplated that the disclosed inventive aspects may be used as part of an add-on system that would be mounted next to an existing smoke detector and electrically connected to the battery connections of the smoke detector.

It is contemplated that the battery or battery pack (hereinafter simply referred as the "battery") will be tethered and thus lowered and raised through the same battery wire that is used to connect the battery to the smoke detector and battery-lowering system. In order to maintain the continuity of the electrical circuit between the battery and the rest to the system, it is contemplated that the battery wire will be attached to the spool, which will in turn be attached to an electric motor.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 is a side view schematic of the main components of the invention.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Turning now to FIG. 1 where a system 10 for lowering a battery or battery pack 12 of a smoke detector 14. In the preferred embodiment of the invention the battery is housed within the smoke detector housing 16, which allows mounting of the system in the same manner as other ceiling mounted smoke detectors. Alternatively, the disclosed system for lowering the battery may be used next to the smoke detector, an thus allow retrofitting or modifying existing smoke detectors to allow for automated lowering of the battery that powers the smoke detector.

Importantly, FIG. 1 illustrates that a preferred example of the system includes the battery pack 12 that is connected to a battery wire 18. The battery wire 18 may be used to the sole tether that supports the entire weight of the battery pack 12 while raising or lowering the battery pack 12. Alternatively, it is contemplated that a line or flexible reinforcements, such as strengthening fibers, may be added to the insulating jacketing of the wire in order to enhance the weight carrying capabilities of the wire. In addition to tethering the battery pack 12 while lowering the battery pack 12, the battery wire 18 transmits electrical energy from the battery pack 12 to the internal systems of the smoke detector 10 in a well-known manner.

The battery wire 18 will be wound around a spool 20 that will pay out or retract the battery wire 18. It is contemplated that an electrical motor 22 will be connected to the spool 20 in order to retract the battery wire 18. It is contemplated that the weight of the battery pack 12 will be used as the source of potential energy to pay out the battery wire 18 when the battery pack 12 reaches a low battery condition or when a specific date for a scheduled battery replacement is reached.

Once a low battery condition is detected, or the scheduled battery replacement date is reached, an engagement mechanism 24 will releases the battery pack 12 or battery receptacle, permitting the battery pack to move down. The mechanical connection or tethering of the battery wire 18 to the spool 20 and motor 22 will allow the battery pack to come down at a slow rate, preventing the battery pack for striking a passer by.

The low battery condition will be detected by a low-voltage detector 26 that will activate or release the engagement mechanism 24, causing the engagement mechanism to release the battery pack in response to a drop in voltage below a predetermined voltage level.

The low-voltage detector 26 will also serve to activate the electric motor 22 after the new batteries have been installed, thus restoring the voltage to the smoke detector 10 to the desired levels. It is contemplated that a delay system, which may be a simple programmed semiconductor chip that controls a switch to the electric motor 22, may be used to activate the electric motor 22 at the desired moment. Thus, the programming will serve to give the user enough time to make sure that the replacement batteries are securely in place prior to raising the battery pack 12.

According to the highly preferred embodiment illustrated in FIG. 1, the battery or battery pack will be contained within an orb 28, which will nest within a mating spherical recess 30 in the housing 16 of the smoke detector. The battery wire 18 will be released through the use of a solenoid 32 that will withdraw a retaining pin 34 from a geared spool 38 that holds the battery wire 18, or another spool or pulley that may be used to control the movement of the wire 18. The spool 20 will include conductive surfaces 36 that will cooperate with brushes 40 that will conduct electricity from the battery to the smoke detector 14.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A system for lowering a battery of a smoke detector, the smoke detector being configured for mounting from the ceiling of a structure, the system comprising:
   a housing that contains:
   a battery wire having a battery connector;
   a spool that rotates to collect or pay out the battery wire, the battery wire acting as a tether and including a conductor;
   a battery pack that is configured for accepting a battery for the smoke detector and for supporting the battery connector, the battery pack being attached to the battery wire and being electrically connected through the conductor to a smoke detection device;
   an electric motor that is connected to the spool such that the rotation of the electric motor in one direction retracts the tether and rotation of the electric motor in another direction pays out the tether, allowing the battery pack to be supported away from the housing while remaining connected to the battery wire, the electric motor being controlled by a programmed control module that is connected to a low-voltage detector that is connected to the battery connector, the programmed control module being programmed to actuate the electric motor to rotate in the direction that pays out the tether in response to a low voltage condition detected in the battery pack by the low-voltage detector and cause the electric motor to retract the tether and move the battery pack towards the housing in response to an acceptable voltage condition in the battery pack.

2. A system for raising and lowering a battery of a smoke detector, the smoke detector being configured for mounting from a structure, the system comprising:
   a housing that contains:
   a battery wire having a battery connector that is configured for connecting to the battery;
   the battery wire being wound around a spool that rotates in one direction to collect and rotates in another direction pay out the battery wire;
   an engagement mechanism that is configured for releasing the spool to allow the spool to rotate or retaining the spool to prevent the spool from rotating;
   a battery pack that is tethered to the spool by the battery wire, the battery pack being electrically connected to a smoke detection device, the battery pack being retained within the housing of the smoke detector by an engagement mechanism;
   an electric motor that is connected to the spool such that the rotation of the electric motor in one direction retracts the battery wire and rotation of the electric motor in another direction pays out the battery wire, the electric motor being controlled by a programmed control module that is connected to a low-voltage detector that is connected to the battery connector, the programmed control module being programmed to actuate the electric motor to rotate in the direction that pays out the tether in response to a low voltage condition in the battery pack and causes the electric motor to retract the tether in response to an acceptable voltage condition in the battery pack.

3. A system for raising and lowering a battery of a smoke detector in response to a low battery condition or in response to reaching a specified calendar date, the smoke detector being configured for mounting from a structure, the system comprising:
   a housing that contains:
   a battery wire having a battery connector, the battery wire being electrically connected to a smoke detection device;
   the battery wire being wound around a spool that rotates in one direction to collect or in another direction pay out the battery wire;
   an engagement mechanism that is configured for releasing the spool to allow the spool to rotate or retaining the spool to prevent the spool from rotating;
   a battery pack that is tethered to the spool by the battery wire and electrically connected to the battery wire, the battery pack being retained against the smoke detector by an engagement mechanism; and
   an electric motor that is connected to the spool such that the rotation of the electric motor in one direction retracts the tether and rotation of the electric motor in another direction pays out the tether;

the electric motor being controlled by a programmed control module that is connected to a low-voltage detector, the programmed control module being programmed to actuate the electric motor to raise or lower the battery pack from the housing by rotating in the direction that pays out the tether in response to a low voltage condition in the battery pack or when a scheduled battery replacement date is reached, and causes the electric motor to retract the tether in response to an acceptable voltage condition in the battery pack.

* * * * *